United States Patent [19]
Madsen

[11] 3,866,070
[45] Feb. 11, 1975

[54] TURBO-GENERATOR OF THE RADIAL SLOT TYPE

[75] Inventor: Kristian Dahl Madsen, Vasteras, Sweden

[73] Assignee: Allmanna Svenska Elektriska Aktiebolaget, Vasteras, Sweden

[22] Filed: Dec. 18, 1972

[21] Appl. No.: 315,870

[30] Foreign Application Priority Data
Dec. 27, 1971 Sweden............................ 16611/71

[52] U.S. Cl. .............................................. 310/214
[51] Int. Cl. ............................................ H02k 3/48
[58] Field of Search ........... 310/179, 180, 187, 188, 310/192, 194, 201, 213, 214, 215, 217, 218, 210, 261, 264, 52, 55, 65

[56] References Cited
UNITED STATES PATENTS

| | | | |
|---|---|---|---|
| 2,465,983 | 3/1949 | Winther | 310/194 |
| 2,920,219 | 1/1960 | Beckwith | 310/55 |
| 2,990,486 | 6/1961 | Willyoung | 310/214 |
| 3,119,033 | 1/1964 | Horsley | 310/214 |
| 3,324,324 | 6/1967 | Richardson | 310/214 |
| 3,395,299 | 7/1968 | Quay | 310/261 |
| 3,408,516 | 10/1968 | Kudlacik | 310/214 |

FOREIGN PATENTS OR APPLICATIONS

| | | | |
|---|---|---|---|
| 980,309 | 1/1965 | Great Britain | 310/214 |
| 1,962,416 | 11/1970 | Germany | 310/214 |

Primary Examiner—R Skudy

[57] ABSTRACT

A turbo-generator of the radial slot type includes a rotor and a stator surrounding the rotor, the rotor having an iron core and a field winding supported thereby. The field winding has a plurality of coils per pole. The rotor body has recesses therein of substantially the same form as the coils, each formed of two axially running winding slots intended for one coil side and two circumferentially running winding slots at each end of the rotor. The circumferentially running slots are provided with toothed walls and there are a plurality of slot wedges in each of said circumferentially running winding slots having toothed side surfaces in engagement with the walls of the slots to absorb at least the greater part of the centrifugal forces acting on the coil and which lies within the slot.

5 Claims, 15 Drawing Figures

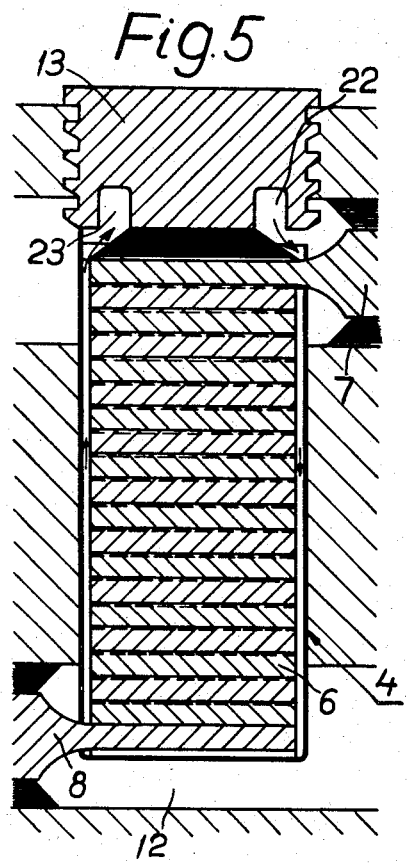
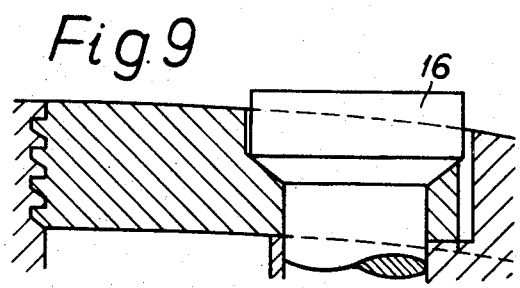
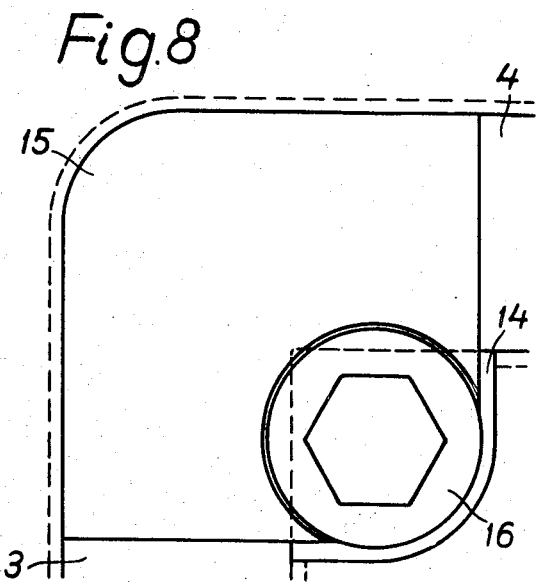
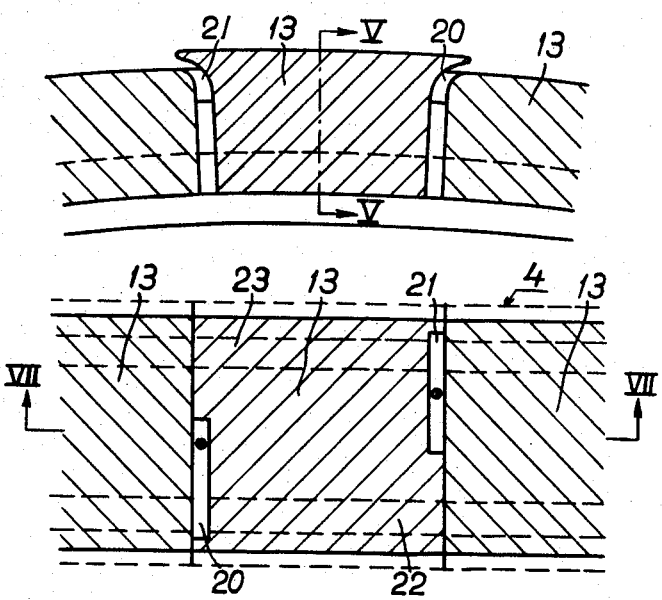
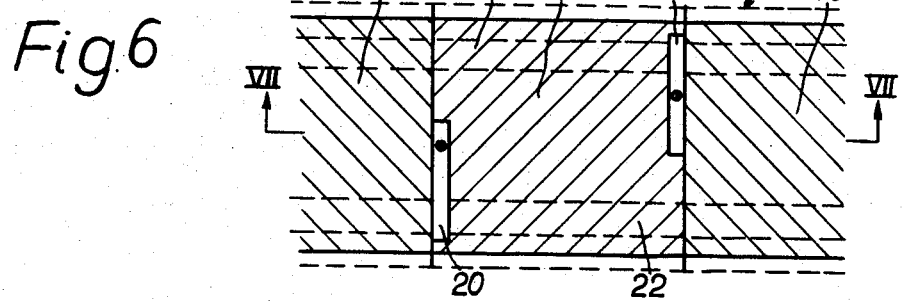

3,866,070

TURBO-GENERATOR OF THE RADIAL SLOT TYPE

BACKGROUND OF THE INVENTION

1. Field of the Invention

The present invention relates to a turbo-generator of the radial slot type of at least 100 MVA and with a speed of at least 1,500 r.p.m., comprising a stator and a rotor surrounded by the stator and having an iron core and a field winding supported by said iron core, the field winding having a plurality of coils per pole.

2. The Prior Art

A turbo-generator which on the whole is of the same type as the one described in the introduction, but probably much inferior with regard to power, is described in German Pat. No. 340,470.

In turbo-generators the rotor is subjected to great centrifugal forces, and it is necessary to secure the coil ends against these forces by means of a particularly strong bandaging or — what is more common, especially in turbo-generators of more than 100 MVA — by means of thick-walled retaining rings made of special steel.

The wall thickness of the retaining rings is limited because the retaining rings which are shrunk on to the rotor body must be able to pass through the stator when assemblying the stator and rotor, and because there are of course limits as to how large an air gap the machine can be made with. Since the tangential stress caused by centrifugal forces is greater in a hollow cylinder than in a solid cylinder with the same diameter and rotating at the same speed, the diameter of a turbo-generator is often limited to a dimension where the tangential stress in the retaining ring is at its highest permissible value. The conditions are similar if, instead of a solid retaining ring, a bandaging is used, for example as shown in the above-mentioned patent. It is true that in the rotor described in the patent the coil ends are arranged in circumferentially running winding slots, which is also the case for the device of this application, but in the known machine no appreciable reduction of the centrifugal forces acting on the bandaging is achieved.

SUMMARY OF THE INVENTION

By the arrangement according to the invention, a turbo-generator is aimed at, the diameter of which can be selected without the restriction resulting from the consideration of the mechanical strength of the retaining ring or the bandaging.

This is achieved by keeping the coil ends in position completely or mainly with the help of relatively short slot wedges, of which a large number are arranged in each circumferentially running winding slot. The slot wedges are formed in the usual way with toothed side surfaces, which are in engagement with the corresponding surfaces of the winding slot.

The invention is characterised by the fact that the field winding of the rotor is supported by an iron core and has a plurality of coils per pole. The rotor body has recesses therein of substantially the same shape as the coils, and each coil is arranged in a recess. Each recess includes two axially running winding slots for the coil sides and furnished with slot wedges and two circumferentially running winding slots arranged at each end of the rotor for the coil ends. The inner walls of the circumferentially running winding slots are toothed, and a plurality of slot wedges are mounted in each of the circumferentially running winding slots with toothed surfaces engaging the toothed walls of the slots.

BRIEF DESCRIPTION OF THE DRAWINGS

In the following the invention will be described with reference to the accompanying drawings, in which

FIG. 6 shows an axial view of the circumferential slot shown in FIG. 5, and

FIG. 7 a radial section through the upper part of the same slot along the line VII—VII of FIG. 6.

The axial section in FIG. 5 lies in the same plane as a section through the line V—V of FIG. 7.

FIG. 8 shows in radial view a corner part of a recess in the rotor body intended for a coil, and FIG. 9 shows a radial section along the line IX—IX of FIG. 8.

Figures 10, 11:
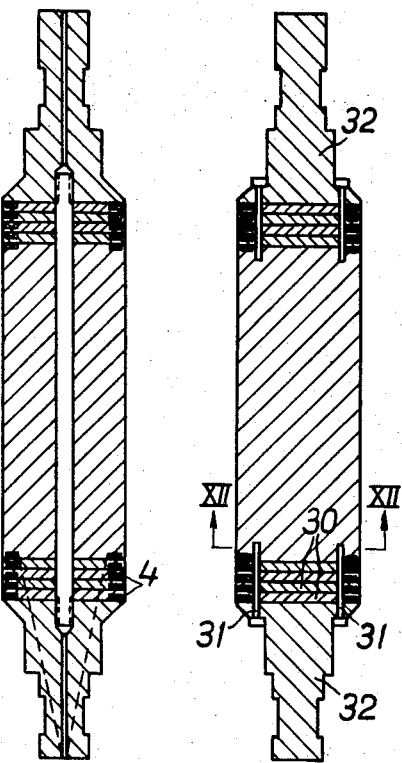

FIG. 10 shows an alternative embodiment of a rotor according to the invention, in which the rotor body is put together from a number of parts arranged axially one after the other, said parts being kept together by a central, threaded rod.

FIG. 11 shows a similar rotor construction in which, instead of the central rod mentioned above, a number of bolts at either end of the rotor are used.

Figure 12:
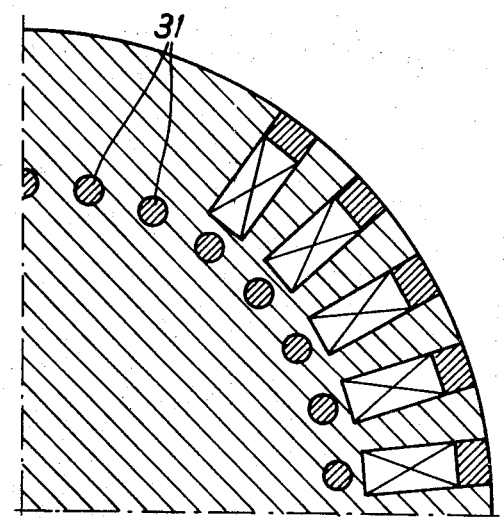

FIG. 12 shows a cross-section along the line XII—XII of FIG. 11, and

Figure 13:
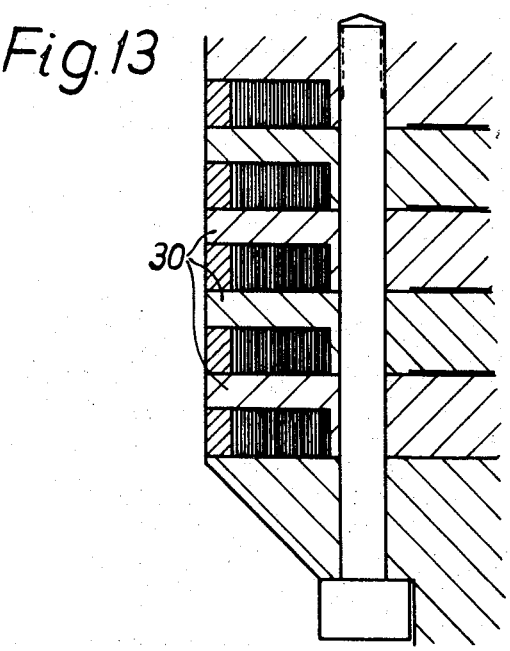

FIG. 13 shows a detail of FIG. 11.

Figure 14:
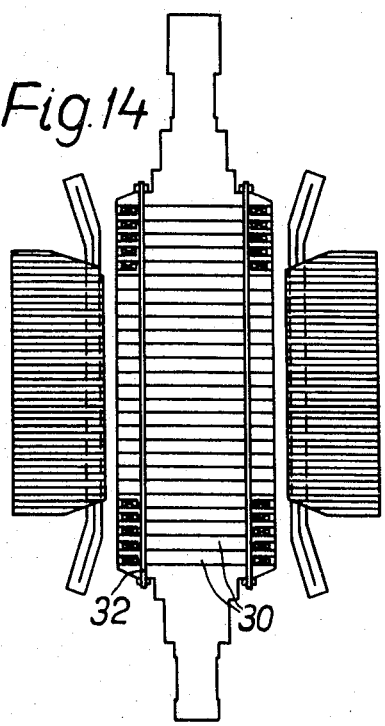

FIG. 14 shows in axial section another embodiment of the invention, in which the rotor body consists of a large number of discs.

Figure 15:
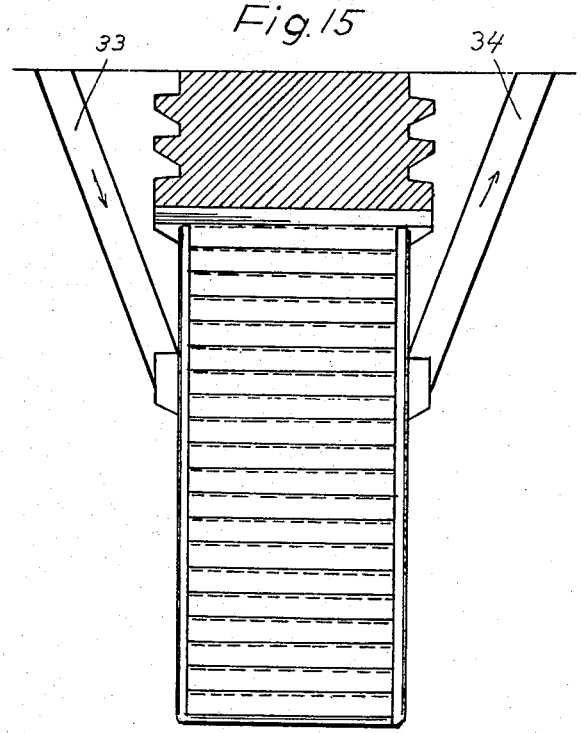

FIG. 15 shows a section through a circumferential slot where inlet and outlet channels for the flow of cooling gas are arranged in the teeth positioned close to the slot, and in this way a weakening of the slot wedge by cooling gas channels is avoided.

DESCRIPTION OF THE PREFERRED EMBODIMENTS

In the drawings, 1 designates the stator of a two-pole turbo-generator and 2 a rotor body made of solid steel. In the rotor body axial winding slots 3 and circumferentially running winding slots 4 are milled. The axial winding slots 3 are connected in pairs at each end of the rotor by the circumferentially running winding slots each intended for one coil end, forming a plurality of substantially rectangular recesses, each of said recesses comprising two axial and two circumferential winding slots. These recesses contain one winding coil each. The coil sides of the rotor running axially are designated 5 and the coil ends of the rotor 4a. Each coil comprises an insulated conductor bar six which is formed to constitute a multiple-turn coil, the ends of which are connected to the connecting conductors 7 and 8. All coils are connected in series to each other by means of the connecting conductors 7 and 8, which are arranged in two axially drilled holes 11 and 12, respectively, at one end of the rotor and possibly in a similar way at the other end of the rotor. The conductor bar 6 is formed with a plurality of transverse cooling channels 9, which are evenly distributed at a mutual distance from each other less than seven times the thickness of the conductor bar. Each of the axially running winding slots is provided with slot wedges 10, which are made with toothed side surfaces. In the present text, the concept "toothed side surfaces" is intended to include also other mechanical connections between the slot wedge and rotor wall for absorbing centrifugal forces than those shown in the drawings, for example simple dovetail joints.

The winding slots 4 running circumferentially are provided with slot wedges 13 of special steel, said slot wedges being made with toothed side surfaces which are in engagement with the corresponding side surfaces of the winding slots 4. Each slot wedge 10 and 13 is comparatively short compared to the length of the slot. This dimension should be less than three times the width of the slot, preferably less than twice the width of the slot. The slot wedges 10 and 13 are applied by first inserting them radially in a short slot part, the top part of which is enlarged to permit radial insertion of the wedge to such a depth that its toothed side surfaces will be at the right level in relation to the corresponding toothed surfaces in the winding slot. After this, the wedge is brought to its final position by displacing it in the direction of the length of the slot.

Of course it is possible in a machine according to the invention to form enlarged parts for radial insertion of slot wedges at arbitrary places in the slots. However, it is most advantageous if such parts are formed at the corners of the above-mentioned recess, since special means are required in any case if a reliable sealing of the slots is to be achieved at the corner part of the recess. In the generator shown in FIG. 1, each of the substantially rectangular coil-recesses of the rotor is made with four corner parts formed for radial insertion of slot wedges, one of said corner parts being shown in FIGS. 8 and 9.

By milling down a corner of the rotor iron protrusion surrounded by the coil recess to a tangential plane which, for the main part, coincides with the lower edge of adjacent slot wedges, an enlargement of a top part of each of the winding slots 3 and 4 is achieved, which is sufficient for radial insertion of slot wedges 10 and 13. The enlargement is considerably larger than what is required in this respect, and in this way a sufficiently large supporting surface 14 for a corner slot wedge 15 is obtained, said corner slot wedge being formed with two toothed side surfaces which form a right angle with each other. After the slot wedges 10 and 13 have been inserted into the slots 3 and 4, the corner slot wedge 15 is inserted radially, after which it is pressed in a direction towards the toothed corner of the coil recess so that it engages with the toothed slot surfaces. The corner slot wedge is locked in a position of engagement by means of a bolt 16 fastened with screws in the rotor iron, said bolt also absorbing a considerable part of the centrifugal forces acting on the corner slot wedges.

A rotor generator according to the invention is especially suitable for rotor cooling by means of an air gap intake. In known applications of this cooling principle the air gap surface of the rotor is used for driving a flow of cooling gas which enters the rotor slots through inlet channels in the slot wedges and then leaves the slots through outlet channels in the slot wedges. Whereas, in known machines of this type, it is necessary to use special fans for cooling of the coil ends, it is possible in a machine according to the invention to cool the coil ends also according to the above-mentioned principle by furnishing the slot wedges of the circumferentially running winding slots with suction and exhaust openings. The large rotor diameter and high peripheral speed of machines according to the invention also increases the efficiency of the air gap intake cooling.

The slot wedge 10 is provided with an inlet channel 17 and an outlet channel 18. The cooling gas flows down into the slot and through the transverse cooling channels 9 in the coil side and then leaves the slot as has been indicated by arrows. (The cavities 19 in the rotor ends are not included in the cooling system of the generator, but only have the purpose of reducing the centrifugal force acting at the roots of the teeth).

As is shown in FIG. 7, some of the slot wedges 13 of the circumferential slots are made with somewhat larger dimensions than the other slot wedges and provided with inlet openings 20 and outlet openings 21 which are directed in the longitudinal direction of the winding slot.

The inlet openings communicate with a circumferentially running channel 22 made in the slot wedges, and the outlet openings with a similar channel 23. From the channel 22 the cooling gas flows down into the winding slot between the coil side and one of the coil walls where it distributes itself among the transverse cooling channels 9, flows through the coil side, is taken up at the other slot wall and exhausted by channel 23.

With a view to reducing the manufacturing costs connected with the design of the circumferential winding slots, it is advantageous in many cases to select a rotor construction where the rotor body at each end has a plurality of discs arranged axially one after the other. Said discs can be made of a material which is either magnetic or non-magnetic. Three variants of such a construction are shown in FIGS. 10, 11 and 14, where the iron discs are designated 30. In FIGS. 11, 12 and 13 the discs formed with tangentail slots are attached to a shaft pin 32 and to the ends of an intermediate iron cylinder 33 having axial slots by means of a number of bolts 31 fastened with screws to such iron cylinder. In FIG. 13 the entire rotor body is built up of iron discs, the axial dimensions of which are substantially equal to the thickness of the discs having circumferential slots. The discs are kept together by a large number of bolts 32. The last-mentioned design is made possible because of the small length of this type of machine in relation to its diameter. For example, a 2-pole 500 MVA machine according to FIG. 14 can be designed subcritically with regard to the fundamental tone of the rotor body, which is hardly possible with any turbo-generator construction known up to now.

Figure 1:
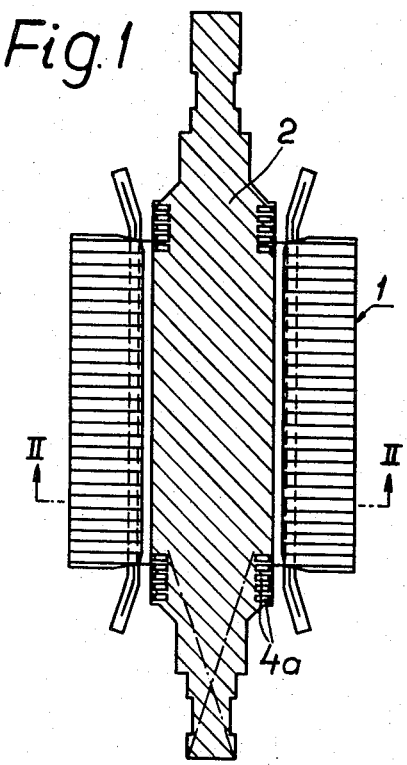
FIG. 1 shows an axial section through the central plane of the pole of a turbo-generator according to the invention, and FIG. 2 a quadrant of the rotor shown in FIG. 1 in section along the line II—II of FIG. 1.
Figure 2:
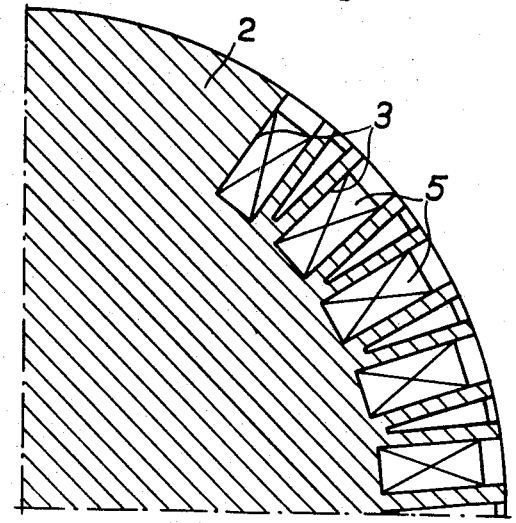
Figure 3:
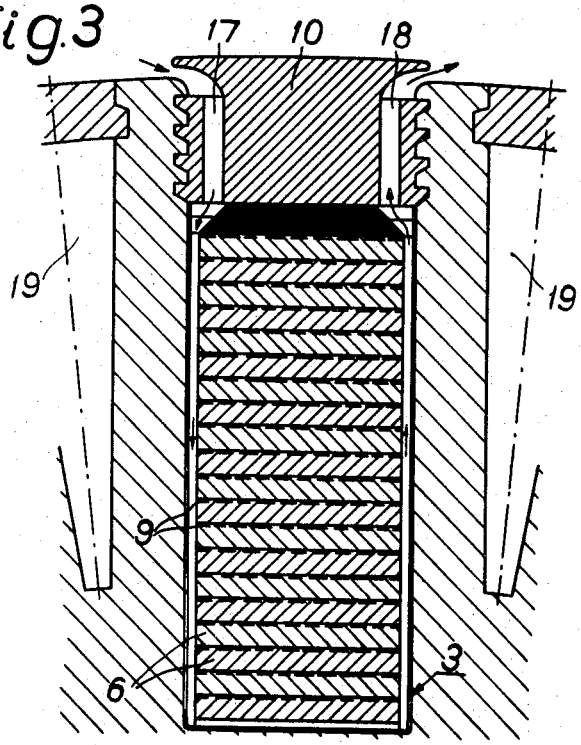
FIG. 3 shows in detail one of the winding slots shown in FIG. 2 with a coil side making contact with it.
Figure 4:
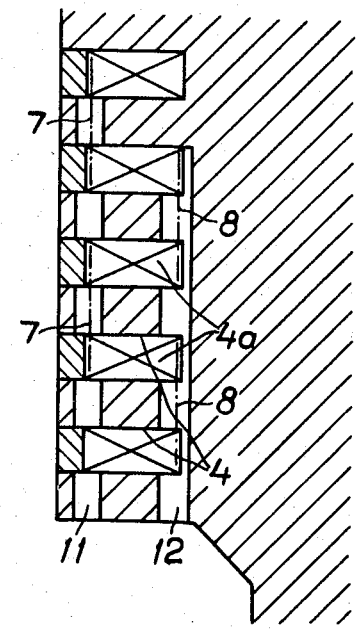
FIG. 4 shows an axial section through the coil ends of a rotor according to the invention, and FIG. 5 a detail of the section shown in FIG. 4.

Especially when the tangential slots must be formed in a uniform rotor body, for example as in FIG. 1, these may be made in the form of turned ring slots in order to save labor. The axial slots can also be milled the full length of the rotor body without causing any considerable deterioration of the magnetic properties of the rotor body. When the rotor diameter exceeds a certain limit, however, the above mentioned manner of production cannot be used, since the ability of the rotor to absorb centrifugal forces would then be reduced too much.

Since a machine according to the invention admits an unusually high rotor diameter, centrifugal forces might cause such strong stress on the slot wedges that it would be desirable to avoid the weakening of said wedges which the inlet and outlet openings, for example 17, 18 and 20, 21, cause. It may then be advantageous to make such openings in the teeth instead, as shown in FIG. 15, where the inlet channels are designated 33 and the outlet channels 34. Since the axially running teeth are much wider at the tops of the teeth than at the roots, channels of this kind will cause no increase in the strain in these teeth, but rather the contrary. Nor does the construction shown in FIG. 15 cause any problem concerning the tangentially running teeth, since it is always possible to select so large a width of the teeth as to give full compensation for the weakening which is the result of the channels 33 and 34.

I claim:

1. Turbo-generator of the radial slot type of at least 100 MVA and with a speed of at least 1,500 r.p.m., comprising a stator and a rotor surrounded by the stator and having an iron core and a field winding supported by said iron core, the field winding having a plurality of coils per pole, said rotor body having recesses therein of substantially the same form as the coils, each coil being arranged in a corresponding recess, each recess comprising two axially running winding slots, intended for one coil side each and furnished with slot wedges, and two circumferentially running winding slots one arranged at each end of the rotor and each intended for one coil end, each of said circumferentially running winding slots having toothed walls, and a plurality of slot wedges in each of said circumferentially running winding slots having toothed side surfaces in engagement with the toothed walls of the slots which together absorb at least the greater part of the centrifugal forces acting on a coil end which lies in the slot, said recess having a corner part formed by one end of an axially running winding slot and one end of a circumferentially running winding slot, at least one of said slot ends having an expanded top part dimensioned to permit radial insertion of a slot wedge intended for the remaining part of the winding slot to such a depth that the toothed surfaces of said slot wedge will be on a level with the corresponding toothed walls of the winding slot.

2. Turbo-generator according to claim 1, in which said corner part is formed by enlarged top parts of the slot ends, and a corner slot wedge having a convex corner, said corner and corner wedge sides converging at said corner being formed with toothed surfaces, which are in engagement with each other, and means locking the corner wedge in a position of engagement.

3. Turbo-generator of the radial slot type of at least 100 MVA and with a speed of at least 1,500 r.p.m., comprising a stator and a rotor surrounded by the stator and having an iron core and a field winding supported by said iron core, the field winding having a plurality of coils per pole, said rotor body having recesses therein of substantially the same form as the coils, each coil being arranged in a corresponding recess, each recess comprising two axially running winding slots, intended for one coil side each and furnished with slot wedges, and two circumferentially running winding slots one arranged at each end of the rotor and each intended for one coil end, each of said circumferentially running winding slots having toothed walls, and a plurality of slot wedges in each of said circumferentially running winding slots having toothed side surfaces in engagement with the toothed walls of the slots which together absorb at least the greater part of the centrifugal forces acting on a coil end which lies in the slot, in which the rotor body comprises a central piece in which the axially running winding slots are contained, and at each end of the central piece a plurality of discs, arranged in radial planes axially one after the other, each of said discs having surfaces constituting two slot walls for circumferentially running slots.

4. Turbo-generator according to claim 3, in which said central piece comprises a plurality of discs arranged axially one after the other.

5. Turbo-generator according to claim 3, in which the rotor body at each end of the central piece comprises a plurality of discs of a non-magnetic material, arranged in radial planes axially one after the other, each of said discs having surfaces constituting two slot walls for circumferentially running slots.

* * * * *